(12) United States Patent
Choi et al.

(10) Patent No.: US 11,814,551 B2
(45) Date of Patent: Nov. 14, 2023

(54) ADHESIVE COMPOSITION AND METHOD OF MANUFACTURING NONPNEUMATIC TIRE BY USING SAME

(71) Applicant: HANKOOK TIRE & TECHNOLOGY CO., LTD., Seoul (KR)

(72) Inventors: Seokju Choi, Daejeon (KR); Daeil Lee, Jeollabuk-do (KR)

(73) Assignee: Hankook Tire & Technology Co., Ltd., Gyeonggi-Do (KR)

( * ) Notice: Subject to any disclaimer, the term of this patent is extended or adjusted under 35 U.S.C. 154(b) by 898 days.

(21) Appl. No.: 16/708,594

(22) Filed: Dec. 10, 2019

(65) Prior Publication Data
US 2020/0248052 A1 Aug. 6, 2020

(30) Foreign Application Priority Data

Feb. 1, 2019 (KR) .......................... 10-2019-0013410

(51) Int. Cl.
| | | |
|---|---|---|
| *C09J 175/04* | (2006.01) | |
| *C09J 5/02* | (2006.01) | |
| *C08G 18/10* | (2006.01) | |
| *C08G 18/32* | (2006.01) | |
| *C08G 18/76* | (2006.01) | |

(52) U.S. Cl.
CPC .......... *C09J 175/04* (2013.01); *C08G 18/10* (2013.01); *C08G 18/3206* (2013.01); *C08G 18/3228* (2013.01); *C08G 18/7671* (2013.01); *C09J 5/02* (2013.01); *C08G 2380/00* (2013.01); *C09J 2301/504* (2020.08)

(58) Field of Classification Search
CPC .............................. C08G 18/10; C08G 18/284
See application file for complete search history.

(56) References Cited

U.S. PATENT DOCUMENTS

| | | | |
|---|---|---|---|
| 8,118,968 B2 | 2/2012 | Moeller et al. | |
| 2005/0126683 A1 | 6/2005 | Hsieh et al. | |
| 2015/0018508 A1* | 1/2015 | Verbeke ................. | C08G 18/10 528/80 |

(Continued)

FOREIGN PATENT DOCUMENTS

| | | |
|---|---|---|
| CN | 1989175 A | 6/2007 |
| CN | 105365478 A | 3/2016 |

(Continued)

OTHER PUBLICATIONS

Kotanen et al. Feasibility of polyamines and cyclic carbonate terminated prepolymers in polyurethane/polyhydroxyurethane synthesis. Materials Today Communications 23 (2020) 100863. (Year: 2020).*

(Continued)

*Primary Examiner* — Michael M Dollinger
(74) *Attorney, Agent, or Firm* — KNOBBE, MARTENS, OLSON & BEAR, LLP

(57) ABSTRACT

The present disclosure relates to an adhesive composition and a method of manufacturing a nonpneumatic tire using the same, and more specifically, to an adhesive composition comprising a linear structured prepolymer for polyurethane having a cyclic carbonate group at both ends thereof and a polyfunctional amine, and a method of manufacturing a nonpneumatic tire using the same.

7 Claims, 1 Drawing Sheet

(56) References Cited

U.S. PATENT DOCUMENTS

| | | | |
|---|---|---|---|
| 2017/0015883 A1 | 1/2017 | Lammerschop et al. | |
| 2017/0088661 A1 | 3/2017 | Michaud et al. | |
| 2017/0107321 A1* | 4/2017 | Michaud | C09J 175/04 |
| 2018/0345726 A1 | 12/2018 | Abell et al. | |
| 2020/0248052 A1* | 8/2020 | Choi | C08G 18/3206 |
| 2021/0253859 A1* | 8/2021 | Sridhar | C08G 18/61 |
| 2021/0395429 A1* | 12/2021 | Chuang | C08G 18/7671 |

FOREIGN PATENT DOCUMENTS

| | | | |
|---|---|---|---|
| CN | 106459356 A | 2/2017 | |
| FR | 3018815 A1 * | 9/2015 | C08G 18/10 |
| FR | 3018816 A1 * | 9/2015 | B32B 37/12 |
| JP | H02-28849 A | 1/1990 | |
| JP | 2005-272592 A | 10/2005 | |
| JP | 5581435 B1 | 8/2014 | |
| JP | 2017-515934 A | 6/2017 | |
| JP | 2017-222760 A | 12/2017 | |
| KR | 10-2009-0084299 A | 8/2009 | |
| KR | 1020090084299 A | 8/2009 | |
| KR | 10-2015-0066746 A | 6/2015 | |
| KR | 10-2016-0141732 A | 12/2016 | |
| KR | 10-2018-0022851 A | 3/2018 | |
| KR | 10-2018-0045032 A | 5/2018 | |
| WO | WO-2020070018 A1 * | 4/2020 | C08G 18/10 |

OTHER PUBLICATIONS

Annunziata et al. α,ω-Di(glycerol carbonate) telechelic polyesters and polyolefins as precursors to polyhydroxyurethanes: an isocyanate-free approach. Green Chem., 2014, 16, 1947-1956. (Year: 2014).*

* cited by examiner

PTMEG 2000 prepolymer    Glycerine carbonate

DBTDL(1000ppm), 60°C

PU prepolymer-GC

ADHESIVE COMPOSITION AND METHOD OF MANUFACTURING NONPNEUMATIC TIRE BY USING SAME

CROSS-REFERENCE TO RELATED APPLICATION

This application claims priority to Korean Patent Application No. 10-2019-0013410, filed on Feb. 1, 2019, the disclosure of which is incorporated herein by reference in its entirety.

BACKGROUND OF THE INVENTION

1. Field of the Invention

The present disclosure relates to an adhesive composition and a method of manufacturing a nonpneumatic tire using the same, and more specifically, to an adhesive composition for chemically bonding an aluminum wheel and a tire made of a polyurethane material and a method of manufacturing a nonpneumatic tire by using the same.

2. Description of Related Art

Aluminum has been used as various structures since aluminum has low specific gravity and excellent corrosion resistance among metal materials. For example, a typical use of aluminum may include an aluminum wheel for an automobile tire. In case of a nonpneumatic tire, which has recently been developed as a next generation electric vehicle tire, a polyurethane tire has been examined due to its advantages favorable to weight lightening and recycling, and lightweight aluminum is the most leading material as a wheel material.

A bonding technique of polyurethane and aluminum is required in manufacturing of such a non-pneumatic polyurethane tire. Since a tire is driven in various environments in a state that the tire is mounted on a vehicle, perfect realization of adhesive force in the tire required in the safety aspect is a very important item.

Since a general adhesive is based on physical bonding with a surface to be adhered, bonding performance of an automobile tire requiring maintenance of adhesive force without setback under severe conditions is not satisfactory.

Since reactive adhesives are preferred to bond a structure of which reliability is regarded as important, it is particularly desirable to chemically bond the reactive adhesives to the surface to be adhered; chemical bonding of a compound favorable to a bonding process is implemented on a metal surface in a primer treatment process using a binder such as a silane compound. Reactive adhesive is required enabling realization of adhesive force without setback during using by implementing chemical bonding between the surface to be adhered and functional groups of a compound existing on the surface after performing a primer treatment process.

Although a polyurethane prepolymer including an isocyanate group is used as a typical reactive adhesive, storage stability is low, and it is difficult to secure reproducibility of reliable adhesive force due to moisture sensitivity of the isocyanate group.

SUMMARY OF THE INVENTION

Accordingly, an objective of the present disclosure is to provide a reactive adhesive composition using a reaction between a polyfunctional amine and a prepolymer for polyurethane having a cyclic carbonate group at both ends thereof as a reactive adhesive composition replacing a polyurethane adhesive having an isocyanate group with low storage stability.

The other objective of the present disclosure is to provide a method of manufacturing a nonpneumatic tire in which a tread made of a polyurethane material and an aluminum wheel are chemically bonded by using the adhesive composition.

In order to accomplish the objectives, an adhesive composition according to an aspect of the present disclosure comprises a linear structured prepolymer for polyurethane having a cyclic carbonate group at both ends thereof and a polyfunctional amine.

Herein, the polyfunctional amine may be included in an amount of 40 to 100 moles based on 100 moles of the prepolymer.

Further, the prepolymer may be produced through a chemical reaction between glycerol carbonate and a reaction product of an organic diisocyanate monomer and a polyol selected from the group consisting of ethylene glycol, diethylene glycol, dipropylene glycol, neopentyl glycol, 1,3-butanediol, 1,4-butanediol, polytetramethylene ether glycol (PTMEG), polypropylene glycol, and dihydroxy polyester.

At this time, the organic diisocyanate monomer may include 4,4'-diphenylmethane diisocyanate (MDI).

Further, the polyfunctional amine may be any one selected from the group consisting of triethylenetetramine (TETA), diethylenetriamine (DETA), tetraethylenepentamine (TEPA), pentaethylenehexamine (PEHA), or mixtures of two or more thereof.

On the other hand, a method of manufacturing a nonpneumatic tire according to the other aspect of the present disclosure comprises: a step (S1) of surface-treating an aluminum wheel with an amino silane compound or an epoxy silane compound; a step (S2) of applying an adhesive composition onto the surface-treated aluminum wheel; a step (S3) of forming a polyurethane prepolymer on the adhesive composition; and a step (S4) of heating a resulting product of the step (S3), wherein the adhesive composition is the aforementioned adhesive composition according to the present disclosure.

According to the present disclosure, adhesive forces between the aluminum wheel and the polyurethane spoke can be perfectly implemented by using an adhesive composition comprising a polyfunctional amine and a linear structured prepolymer for polyurethane having a cyclic carbonate group at both ends thereof when bonding a spoke made of polyurethane to the surface of an aluminum wheel surface-treated with a silane-based compound during manufacturing of a nonpneumatic tire, thereby performing a chemical bonding process on the surface of the aluminum wheel.

DETAILED DESCRIPTION OF THE INVENTION

Hereinafter, the present disclosure will be described in more detail.

An adhesive composition according to an aspect of the present disclosure comprises a linear structured prepolymer for polyurethane having a cyclic carbonate group at both ends thereof and a polyfunctional amine.

In many cases, the compound does not have a sufficient mechanical strength when forming polyurethane hydroxide by a reaction of a compound simply having two or more cyclic carbonate groups in a molecule thereof with a polyfunctional amine. Sufficient mechanical strength is accomplished, and the adhesive forces between the aluminum wheel and the polyurethane spoke can be perfectly implemented at the same time by using an adhesive composition comprising a polyfunctional amine and a linear structured prepolymer for polyurethane having a cyclic carbonate group at both ends thereof as described in the present disclosure.

Herein, the polyfunctional amine may be included in an amount of 40 to 100 moles based on 100 moles of the prepolymer. At this time, when the polyfunctional amine satisfies the amount, the polyfunctional amine may exhibit a very high adhesive force between the aluminum wheel and polyurethane.

Meanwhile, the linear structured prepolymer for polyurethane having a cyclic carbonate group at both ends thereof may be produced through a chemical reaction between glycerol carbonate, i.e., cyclic carbonate and a reaction product of an organic diisocyanate monomer and a polyol selected from the group consisting of ethylene glycol, diethylene glycol, dipropylene glycol, neopentyl glycol, 1,3-butanediol, 1,4-butanediol, polytetramethylene ether glycol (PTMEG), polypropylene glycol, and dihydroxy polyester.

Glycerol carbonate is frequently used generally in production of non-isocyanate polyurethane (NIPU). However, glycerol carbonate is used for end-capping both ends of such a prepolymer after producing a conventional prepolymer by using an aromatic isocyanate in the present disclosure.

Figure 1:
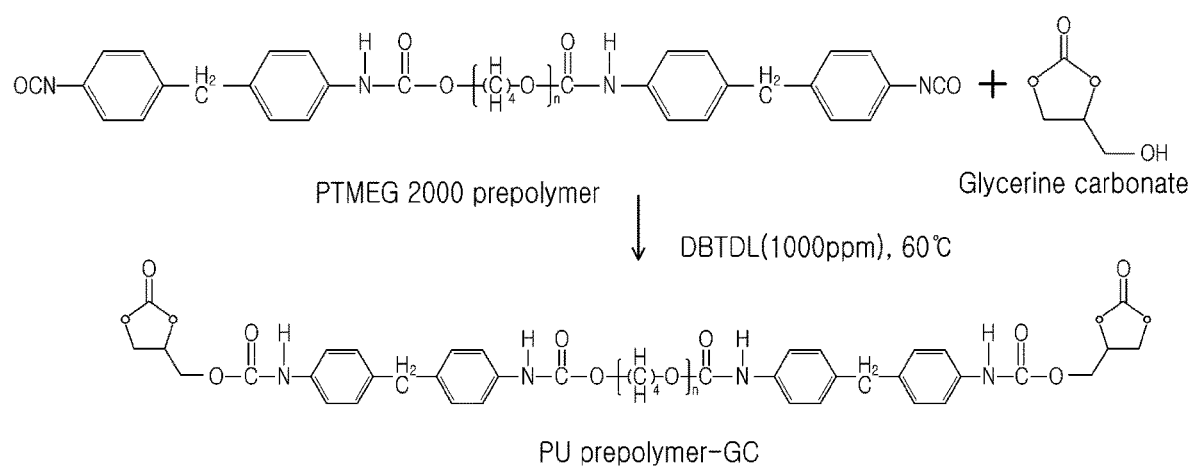
FIG. 1 is a drawing showing a method of synthesizing a linear structured prepolymer for polyurethane having a cyclic carbonate group at both ends thereof according to an embodiment of the present disclosure by using a PTMEG-2000 prepolymer for polyurethane and glycerol carbonate.

FIG. 1 is a drawing showing a method of synthesizing a linear structured prepolymer for polyurethane having a cyclic carbonate group at both ends thereof according to an embodiment of the present disclosure by using a PTMEG-2000 prepolymer for polyurethane and glycerol carbonate.

Referring to FIG. 1, a linear structured prepolymer for polyurethane having a cyclic carbonate group at both ends thereof by reacting a PTMEG-2000 prepolymer with glycerol carbonate at 60° C. and under condition of 1,000 ppm of dibutyl tin dilaurate (DBTDL) as a catalyst, the PTMEG-2000 prepolymer being synthesized from polytetramethylene ether glycol (PTMEG), as a polyol, having a isocyanate group at both ends thereof and a weight molecular weight of 2,000 g/mol and 4,4'-diphenylmethane diisocyanate (MDI), i.e., an organic diisocyanate monomer.

Meanwhile, although the polyfunctional amine according to the present disclosure may be any one selected from the group consisting of triethylenetetramine (TETA), diethylenetriamine (DETA), tetraethylenepentamine (TEPA), pentaethylenehexamine (PEHA), or mixtures of two or more thereof, the present disclosure is not limited thereto.

Figure 2:
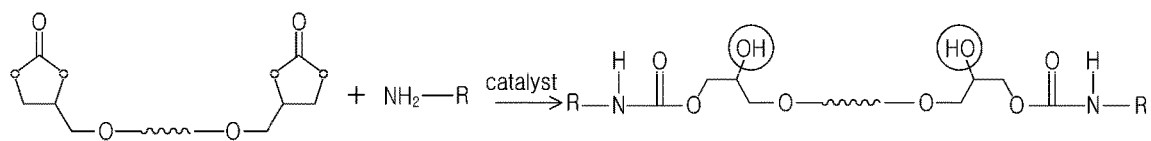
FIG. 2 is a drawing showing a method of synthesizing polyurethane hydroxide by reacting amine with a linear structured prepolymer for polyurethane having a cyclic carbonate group at both ends thereof according to an embodiment of the present disclosure.

FIG. 2 is a drawing showing a method of synthesizing polyurethane hydroxide by reacting amine with a linear structured prepolymer for polyurethane having a cyclic carbonate group at both ends thereof according to an embodiment of the present disclosure.

Referring to FIG. 2, a catalyst is required to produce polyurethane hydroxide through a reaction between the prepolymer and the polyfunctional amine, and a representative catalyst mainly used includes tertiary amine such as triethylene diamine or the like.

On the other hand, a method of manufacturing a nonpneumatic tire according to the other aspect of the present disclosure comprises: a step (S1) of surface-treating an aluminum wheel with an amino silane compound or an epoxy silane compound; a step (S2) of applying an adhesive composition onto the surface-treated aluminum wheel; a step (S3) of forming a polyurethane prepolymer on the adhesive composition; and a step (S4) of heating a resulting product of the step (S3), wherein the adhesive composition is the aforementioned adhesive composition according to the present disclosure.

Adhesive forces between the aluminum wheel and a tread or a spoke which is made of polyurethane can be perfectly implemented by allowing a chemical bonding process to be performed between an adhesive composition and a polyurethane prepolymer on the surface of the aluminum wheel when am aluminum wheel is surface-treated with an amino silane compound or an epoxy silane compound as described above.

At this time, a heating process of the step (S4) may be performed at 110° C. for 12 hours to cure polyurethane.

Meanwhile, when a tread of a nonpneumatic tire according to the present disclosure is manufactured of polyurethane, the tread of the nonpneumatic tire manufactured of polyurethane may exhibit a braking performance level less than half of a pneumatic tire. Therefore, a rubber composition for the nonpneumatic tire tread may be a material for the pneumatic tire, and the nonpneumatic tire may be manufactured by bonding the rubber composition for the nonpneumatic tire tread to a spoke made of a polyurethane material.

At this time, a raw rubber of a rubber composition for tire tread may be any one selected from the group consisting of a natural rubber, a synthetic rubber, and a combination thereof.

The natural rubber may be a general natural rubber or a modified natural rubber.

The general natural rubber may include any rubbers which have been known as a natural rubber without limiting place of origin or the like thereof. The natural rubber includes cis-1,4-polyisoprene as a main body, but may include trans-1,4-polyisoprene according to required characteristics. Therefore, the natural rubber may also include a natural rubber including trans-1,4-isoprene as a main body, e.g., balata or the like, i.e., a type of South American Sapotaceae rubber besides the natural rubber including cis-1,4-polyisoprene as a main body.

The modified natural rubber means a natural rubber obtained by modifying or purifying the general natural rubber. For example, the modified natural rubber may include an epoxidized natural rubber (ENR), a deproteinized natural rubber (DPNR), a hydrogenated natural runner, etc.

Further, a reinforcing filler may include carbon black, silica, or a mixture thereof.

On the other hand, a rubber composition for the tire tread may further comprise optionally additional various additives including a vulcanizing agent, a vulcanization accelerator, a vulcanization acceleration aid, an antiaging agent, a softener, a retarder, an adhesive, etc. The various additives may include any additives which are generally used in the art to which the present disclosure pertains, and amounts of the additives are in accordance with a mixing ratio used in a general rubber composition for tire tread. Therefore, the amounts of the additives are not particularly limited.

The vulcanizing agent may preferably include a sulfur-based vulcanizing agent. The sulfur-based vulcanizing agent may include an inorganic vulcanizing agent such as sulfur (S) powder, insoluble sulfur (S), precipitated sulfur (S), colloidal sulfur, etc. Specifically, the sulfur-based vulcanizing agent may include a vulcanizing agent for producing element sulfur or sulfur, e.g., amine disulfide, polymer sulfur, etc.

The vulcanizing agent is preferably included in an amount of 0.5 to 4.0 parts by weight with respect to 100 parts by weight of the raw rubber in that the vulcanizing agent makes the raw rubber less sensitive to heat and allows the raw rubber to be chemically stable as appropriate vulcanizing effects.

The vulcanization accelerator means an accelerator which accelerates vulcanization rate or accelerates delayed action in an initial vulcanization step.

The vulcanization accelerator may include any one selected from the group consisting of a sulfenamide-based vulcanization accelerator, a thiazole-based vulcanization accelerator, a thiuram-based vulcanization accelerator, a thiourea-based vulcanization accelerator, a guanidine-based vulcanization accelerator, a dithiocarbamic acid-based vulcanization accelerator, an aldehyde-amine based vulcanization accelerator, an aldehyde-ammonia based vulcanization accelerator, an imidazoline-based vulcanization accelerator, a xanthate-based vulcanization accelerator, and combinations thereof.

For example, the sulfenamide-based vulcanization accelerator may include any one sulfenamide-based compound selected from the group consisting of N-cyclohexyl-2-benzothiazolesulfenamide (CBS), N-tert-butyl-2-benzothiazolesulfenamide (TBBS), N,N-dicyclohexyl-2-benzothiazolesulfenamide, N-oxydiethylene-2-benzothiazolesulfenamide, N,N-diisopropyl-2-benzothiazolesulfenamide, and combinations thereof.

For example, the thiazole-based vulcanization accelerator may include any one thiazole-based compound selected from the group consisting of 2-mercaptobenzothiazole (MBT), dibenzothiazole disulfide (MBTS), a sodium salt of 2-mercaptobenzothiazole, a zinc salt of 2-mercaptobenzothiazole, a copper salt of 2-mercaptobenzothiazole, a cyclohexylamine salt of 2-mercaptobenzothiazole, 2-(2,4-dinitrophenyl)mercaptobenzothiazole, 2-(2,6-diethyl-4-morpholinothio)benzothiazole, and combinations thereof.

For example, the thiuram-based vulcanization accelerator may include any one thiuram-based compound selected from the group consisting of tetramethylthiuram disulfide (TMTD), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide, pentamethylenethiuram tetrasulfide, and combinations thereof.

For example, the thiourea-based vulcanization accelerator may include any one thiourea-based compound selected from the group consisting of thiocarbamide, diethylthiourea, dibutylthiourea, trimethylthiourea, Di-o-tolylthiourea, and combinations thereof.

For example, the guanidine-based vulcanization accelerator may include any one guanidine-based compound selected from the group consisting of diphenylguanidine, Di-o-tolylguanidine, triphenylguanidine, o-Tolylbiguanide, diphenylguanidine phthalate, and combinations thereof.

For example, the dithiocarbamic acid-based vulcanization accelerator may include any one dithiocarbamic acid-based compound selected from the group consisting of zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, a complex salt of zinc pentamethylenedithiocarbamate and piperidine, zinc hexadecylisopropyldithiocarbamate, zinc octadecylisopropyldithiocarbamate, zinc dibenzyldithiocarbamate, sodium diethyldithiocarbamate, piperidine pentamethylenedithiocarbamate, selenium dimethyldithiocarbamate, tellurium diethyldithiocarbamate, cadmium diamyldithiocarbamate, and combinations thereof.

For example, the aldehyde-amine based or aldehyde-ammonia based vulcanization accelerator may include an aldehyde-amine based or aldehyde-ammonia based compound selected from the group consisting of an acetaldehyde-aniline reactant, a butylaldehyde-aniline condensate, hexamethylenetetramine, an acetaldehyde-ammonia reactant, and combinations thereof.

For example, the imidazoline-based vulcanization accelerator may include imidazoline-based compounds such as 2-mercaptoimidazoline, etc., and the xanthate-based vulcanization accelerator may include xanthate-based compounds such as zinc dibutylxanthate, etc.

The vulcanization accelerator may be included in an amount of 0.5 to 4.0 parts by weight with respect to 100 parts by weight of the raw rubber to maximize improvements in productivity and rubber physical properties through acceleration of vulcanization rate.

Meanwhile, the vulcanization acceleration aid, as a compounding agent which is used in a combination with the vulcanization accelerator to complete its acceleration effect, may include any one selected from the group consisting of an inorganic vulcanization acceleration aid, an organic vulcanization acceleration aid, and a combination thereof.

The inorganic vulcanization acceleration aid may include any one selected from the group consisting of zinc oxide (ZnO), zinc carbonate, magnesium oxide (MgO), lead oxide, potassium hydroxide, and combinations thereof. The organic vulcanization acceleration aid may include any one selected from the group consisting of stearic acid, zinc stearate, palmitic acid, linoleic acid, oleic acid, lauric acid, dibutyl ammonium oleate, derivatives thereof, and combinations thereof.

Particularly, the zinc oxide and the stearic acid may be used together as the vulcanization acceleration aid. In this case, a crosslinking reaction of rubber is facilitated by dissolving the lead oxide in the stearic acid, thereby producing sulfur favorable to a vulcanization reaction by forming an effective complex with the vulcanization accelerator.

The zinc oxide and the stearic acid may respectively be used in amounts of 1 to 5 parts by weight and 0.5 to 3 parts by weight with respect to 100 parts by weight of the raw rubber in order to perform an appropriate role as the vulcanization acceleration aid when the zinc oxide and the stearic acid are used together. Productivity may be deteriorated since vulcanization rate is slow when the zinc oxide and the stearic acid are used in amounts less than the ranges, while physical properties may be lowered since a scorch phenomenon occurs when the zinc oxide and the stearic acid are used in amounts more than the ranges.

Meanwhile, the antiaging agent is an additive which is used to stop a chain reaction in which a tire is automatically oxidized by oxygen. The antiaging agent may include any one appropriately selected from the group consisting of an amine-based antiaging agent, a phenolic antiaging agent, a quinoline-based antiaging agent, an imidazole-based antiaging agent, a carbamate metal salt, wax, and combinations thereof.

The amine-based antiaging agent may include any one selected from the group consisting of N-phenyl-N'-(1,3-dimethyl)-p-phenylenediamine, N-(1,3-dimethylbutyl)-N'-phenyl-p-phenylenediamine, N-phenyl-N'-isopropyl-p-phenylenediamine, N, N'-diphenyl-p-phenylenediamine, N,N'-diaryl-p-phenylenediamine, N-phenyl-N'-cyclohexyl-p-phenylenediamine, N-phenyl-N'-octyl-p-phenylenediamine, and combinations thereof. The phenolic antiaging agent may include any one selected from the group consisting of 2,2'-methylene-bis(4-methyl-6-tert-butylphenol), 2,2'-isobutylidene-bis(4,6-dimethylphenol), 2,6-di-t-butyl-p-cresol, and combinations thereof. The quinoline-based antiaging agent may include 2,2,4-trimethyl-1,2-dihydroquinoline and derivatives thereof, specifically any one selected from the group consisting of 6-ethoxy-2,2,4-trimethyl-1,2-dihydroquinoline, 6-anilino-2,2,4-trimethyl-1,2-dihydroquinoline, 6-dodecyl-2,2,4-trimethyl-1,2-dihydroquinoline, and combinations thereof. The wax preferably includes waxy hydrocarbons.

Further, the antiaging agent may be included in an amount of 1 to 10 parts by weight with respect to 100 parts by weight of the raw rubber considering conditions that the antiaging agent should have a high solubility for rubber besides an antiaging effect, should have a low volatility, should be inactive to rubber, and should not hinder vulcanization.

On the other hand, the softener which is added to the rubber composition to facilitate processing or lower hardness of vulcanized rubber by giving plasticity to rubber means other oil materials used during rubber mixing or rubber manufacturing. The softener means oils included in process oil or other rubber compositions. Although the softener may include any one selected from the group consisting of a petroleum-based oil, a vegetable oil, and a combination thereof, the present invention is not limited thereto.

The petroleum-based oil may include any one selected from the group consisting of a paraffin-based oil, a naphthene-based oil, an aromatic oil, and combinations thereof.

Typical examples of the paraffin-based oil may include P-1, P-2, P-3, P-4, P-5, P-6, etc. of Michang Oil Industry Co., Ltd. Typical examples of the naphthene-based oil may include N-1, N-2, N-3, etc. of Michang Oil Industry Co., Ltd. Typical examples of the aromatic oil may include A-2, A-3, etc. of Michang Oil Industry Co., Ltd.

However, since a cancer-causing possibility has been known to be high when polycyclic aromatic hydrocarbons (hereinafter, referred to as 'PAHs') included in the aromatic oil have a content of 3 wt % or more along with a recent upsurge of environmental consciousness, the aromatic oil may preferably include a treated distillate aromatic extract (TDAE) oil, a mild extraction solvate (MES) oil, a residual aromatic extract (RAE) oil, or a heavy naphthenic oil.

Particularly, the oil used as the softener may preferably be TDAE oil in which components of PAHs are included in a total amount of 3 wt % or less with respect to the total oil weight, which has a kinematic viscosity of 95 or more (210° F. SUS), and which comprises 15 to 25 wt % of an aromatic component, 27 to 37 wt % of a naphthenic component, and 38 to 58 wt % of a paraffinic component in the softener.

The TDAE oil has characteristics advantageous even to environmental factors such as a cancer-causing possibility of PAHs while enabling a tire tread including the TDAE oil to maintain excellent low temperature characteristics and fuel efficiency performance.

The vegetable oil may include any one selected from the group consisting of castor oil, cottonseed oil, linseed oil, canola oil, soybean oil, palm oil, coconut oil, peanut oil, pine oil, pine tar, tall oil, corn oil, rice bran oil, safflower oil, sesame oil, olive oil, sunflower oil, palm kernel oil, *camellia* oil, jojoba oil, Macadamia Nut Oil, Carthamus Tinctorius (Safflower) Seed Oil, Chinese wood oil, and combinations thereof.

The softener is preferably included in an amount of 0 to 20 parts by weight with respect to 100 parts by weight of the raw rubber in that the softener improves processability of the raw rubber.

Meanwhile, the retarder may include any one selected from the group consisting of phthalate anhydride, salicylic acid, sodium acetate, N-cyclohexyl thiophthalimide, and combinations thereof. The retarder may be included in an amount of 0.1 to 0.5 part by weight with respect to 100 parts by weight of the raw rubber.

Further, the adhesive contributes to improvement in physical properties of the rubber composition by further improving tack performance between rubbers and improving mixability, dispersibility and processability of other additives including a filler.

The adhesive may include a natural resin-based adhesive such as a rosin-based resin or a terpene-based resin, and a synthetic resin-based adhesive such as petroleum resin, coal tar, alkyl phenolic resin, etc.

The rosin-based resin may be any one selected from the group consisting of a rosin resin, a rosin ester resin, a hydrogen-added rosin ester resin, derivatives thereof, and combinations thereof. The terpene-based resin may be any one selected from the group consisting of a terpene resin, a terpene phenol resin, and a combination thereof.

The petroleum resin may be any one selected from the group consisting of an aliphatic resin, an acid-modified aliphatic resin, an alicyclic resin, a hydrogen-added alicyclic resin, an aromatic ($C_9$) resin, a hydrogen-added aromatic resin, a $C_5$-$C_9$ copolymer resin, a styrene resin, a styrene copolymer resin, and combinations thereof.

The coal tar may be coumarone-indene resin.

The alkyl phenolic resin may be p-tert-alkylphenol formaldehyde resin or resorcinol formaldehyde resin, and the p-tert-alkylphenol formaldehyde resin may be any one selected from the group consisting of p-tert-butylphenol formaldehyde resin, p-tert-octyl phenol formaldehyde resin, and a combination thereof.

The adhesive may be included in an amount of 2 to 4 parts by weight with respect to 100 parts by weight of the raw rubber. Adhesion performance of the rubber may become disadvantageous when the adhesive is included in an amount of less than 2 parts by weight with respect to 100 parts by weight of the raw rubber, while physical properties of the rubber may be deteriorated when the adhesive is included in an amount of more than 4 parts by weight with respect to 100 parts by weight of the raw rubber.

On the other hand, a nonpneumatic tire according to the present disclosure may be a tire for a passenger vehicle, a tire for a racing car, an aircraft tire, a tire for an agricultural machine, a tire for off-the-road driving, a truck tire, a bus tire, or the like. Further, the tire may be a radial tire or a bias tire.

Hereinafter, Examples of the present invention will be described in detail so that the present invention can be easily practiced by those skilled in the art to which the present disclosure pertains. However, the present invention can be implemented in various different forms and is not limited to the Examples described herein.

Preparation Example: Preparation of Adhesive Compositions

Adhesive compositions according to Examples and Comparative Example were prepared by compositions as represented in the following Table 1.

TABLE 1

| Composition | Comparative Example 1 | Example 1 | Example 2 | Example 3 | Example 4 | Example 5 |
|---|---|---|---|---|---|---|
| Prepolymer[1] | 100 | 100 | 100 | 100 | 100 | 100 |
| Polyfunctional amine[2] | 0 | 20 | 40 | 60 | 80 | 100 |

(Unit: molar ratio)
[1]Prepolymer is a linear structured prepolymer for polyurethane which is produced from polytetramethylene ether glycol (PTMEG) having a weight average molecular weight of 2,000 g/mol and has a glycerol carbonate group at both ends thereof
[2]Polyfunctional amine is triethylenetetramine (TETA)

Experimental Example: Measurement of Adhesive Force Values

Adhesive force values between aluminum surface-treated with 3-(triethoxysilyl)propylamine(3-aminopropyltriethoxysilane) and polyurethane elastomers having a Shore A harness level of 95 were measured to measure adhesive force values according to adhesive compositions prepared in the Examples and Comparative Example.

First, after applying adhesive compositions having the above-mentioned compositions to the surface-treated aluminum specimens, applying a mixture of a polyurethane prepolymer and 1,4-butadiene to the adhesive compositions applied to the aluminum specimens, maintaining the mixture applied to the adhesive compositions at 110° C. for 12 hours to cure the same, and measuring adhesive force values between polyurethane and aluminum, the measured adhesive force values are represented in the following Table 2.

TABLE 2

| | Comparative Example 1 | Example 1 | Example 2 | Example 3 | Example 4 | Example 5 |
|---|---|---|---|---|---|---|
| T-peel adhesive force (kgf/cm) between polyurethane and aluminum | 5.00 | 7.77 | 15.52 | 11.25 | 15.60 | 20.12 |

As can be seen in Table 2, it can be confirmed that Examples 2 to 5 in which a molar ratio of triethylenetetramine is 40 moles or more based on 100 moles of the prepolymer in the adhesive compositions exhibit as few as two times or more to as many as 4 times or more of adhesive force values compared to Comparative Example 1, and bonding is perfectly made in the interface by seeing that breakage is occurred in polyurethane without breakage being occurred in an interface particularly when evaluating adhesive force values.

Hereinabove, exemplary embodiments of the present disclosure have been described in detail. However, the scope of the present disclosure is not limited thereto, but various changes or modified forms of those skilled in the art using a basic concept of the present disclosure defined in the following claims can also be within the scope of the present disclosure.

What is claimed is:

1. A nonpneumatic tire comprising:
   an aluminum wheel having a surface treated with an amino silane compound or an epoxy silane compound; and
   an adhesive composition formed on the surface-treated aluminum wheel, the adhesive composition comprising:
   a linear structured prepolymer for polyurethane having a cyclic carbonate group at both ends thereof; and
   a polyfunctional amine.

2. The nonpneumatic tire of claim 1, wherein the polyfunctional amine is included in an amount of 40 to 100 moles based on 100 moles of the prepolymer.

3. The nonpneumatic tire of claim 1, wherein the linear structured prepolymer is produced through a chemical reaction between glycerol carbonate and a reaction product of an organic diisocyanate monomer and a polyol selected from the group consisting of ethylene glycol, diethylene glycol, dipropylene glycol, neopentyl glycol, 1,3-butanediol, 1,4-butanediol, polytetramethylene ether glycol (PTMEG), polypropylene glycol, and dihydroxy polyester.

4. The nonpneumatic tire of claim 3, wherein the organic diisocyanate monomer includes 4,4'-diphenylmethane diisocyanate (MDI).

5. The nonpneumatic tire of claim 1, wherein the polyfunctional amine is any one selected from the group consisting of triethylenetetramine (TETA), diethylenetriamine (DETA), tetraethylenepentamine (TEPA), pentaethylenehexamine (PEHA), or mixtures of two or more thereof.

6. A method of manufacturing a nonpneumatic tire, the method comprising:
   treating a surface of an aluminum wheel with an amino silane compound or an epoxy silane compound;
   applying an adhesive composition onto the surface-treated aluminum wheel; and
   forming a polyurethane prepolymer on the adhesive composition; and
   heating a resulting product of the polyurethane prepolymer formation,
   wherein the adhesive composition is an adhesive composition comprising:
   a linear structured prepolymer for polyurethane having a cyclic carbonate group at both ends thereof; and
   a polyfunctional amine.

7. The nonpneumatic tire of claim 1, further comprising:
a polyurethane prepolymer formed on the adhesive composition.

\* \* \* \* \*